(12) United States Patent
Vijayakumari Mahasenan et al.

(10) Patent No.: US 11,361,654 B2
(45) Date of Patent: Jun. 14, 2022

(54) OPERATING A FIRE SYSTEM NETWORK

(71) Applicant: Honeywell International Inc., Morris Plains, NJ (US)

(72) Inventors: Arun Vijayakumari Mahasenan, Hopkins, MN (US); Andrew Berezowski, Wallingford, CT (US); Edward Kurtz, St. Charles, IL (US); Nicolas Sornin, La Tronche (FR); Michael Grudsky, Upper Holland, PA (US)

(73) Assignee: Honeywell International Inc., Charlotte, NC (US)

( * ) Notice: Subject to any disclaimer, the term of this patent is extended or adjusted under 35 U.S.C. 154(b) by 129 days.

(21) Appl. No.: 16/997,712

(22) Filed: Aug. 19, 2020

(65) Prior Publication Data
US 2022/0058936 A1 Feb. 24, 2022

(51) Int. Cl.
*G08B 25/00* (2006.01)
*G08B 25/10* (2006.01)
*G08B 27/00* (2006.01)
*G08B 17/00* (2006.01)
*H04L 12/18* (2006.01)
*H04W 88/16* (2009.01)
(Continued)

(52) U.S. Cl.
CPC .......... *G08B 25/007* (2013.01); *G08B 17/00* (2013.01); *G08B 25/10* (2013.01); *G08B 27/005* (2013.01); *H04L 12/1868* (2013.01); *H04L 12/5601* (2013.01); *H04W 88/16* (2013.01); *H04L 2012/561* (2013.01); *H04L 2012/5675* (2013.01)

(58) Field of Classification Search
CPC ...... G08B 25/007; G08B 17/00; G08B 25/10; G08B 27/005; H04L 12/1868; H04L 12/5601; H04L 2012/561; H04L 2012/5675; H04W 88/16
See application file for complete search history.

(56) References Cited

U.S. PATENT DOCUMENTS 5,751,209 A * 5/1998 Werner ................... G08B 17/00
340/517
2011/0285516 A1* 11/2011 Ritter .................... H04W 88/04
370/276
(Continued)

OTHER PUBLICATIONS

Extended European Search Report for related EP Application No. 21189994.3, dated Jan. 18, 2022 (10 pgs).
(Continued)

*Primary Examiner* — Ojiako K Nwugo
(74) *Attorney, Agent, or Firm* — Brooks, Cameron & Huebsch, PLLC

(57) ABSTRACT

Methods, devices, and systems for operating a fire system network are described herein. One method includes receiving a plurality of time-slotted maintenance messages over a period of time from each of a plurality of fire system devices located in a facility via a first spreading factor, receiving an event message from a fire system device of the plurality of fire system devices responsive to the fire system device determining a fire event, the event message sent via a second spreading factor, and sending a block actuate message to the plurality of fire system devices responsive to receiving the event message, wherein the block actuate message is configured to activate a fire alarm.

20 Claims, 5 Drawing Sheets

(51) Int. Cl.
    *H04L 12/54*       (2022.01)
    *H04L 12/70*       (2013.01)

(56) References Cited

U.S. PATENT DOCUMENTS

| | | | |
|---|---|---|---|
| 2016/0014772 A1 | 1/2016 | Suresh et al. | |
| 2016/0044661 A1 | 2/2016 | Suresh | |
| 2016/0189504 A1 | 6/2016 | Kore | |
| 2016/0352575 A1* | 12/2016 | Frison | G08B 25/003 |
| 2017/0187783 A1* | 6/2017 | Pogorelik | H04L 67/06 |
| 2020/0012859 A1* | 1/2020 | Zheng | G06V 10/22 |
| 2020/0054905 A1* | 2/2020 | Livchak | G08B 17/107 |
| 2020/0152035 A1* | 5/2020 | Kim | H04M 1/72424 |
| 2020/0155882 A1* | 5/2020 | Tohidi | G06N 7/005 |
| 2020/0196110 A1* | 6/2020 | Jakobsson | H04W 76/14 |
| 2021/0077844 A1* | 3/2021 | DeNunzio | A62C 37/44 |
| 2021/0110136 A1* | 4/2021 | Ganti | G01C 23/00 |
| 2021/0287318 A1* | 9/2021 | Sterpin | H04W 4/33 |
| 2021/0299499 A1* | 9/2021 | Hofmann | A62C 37/40 |
| 2022/0016455 A1* | 1/2022 | Tohidi | G06N 20/10 |

OTHER PUBLICATIONS

Yapar, et al., "Time-Slotted ALHOA-based LoRaWAN Scheduling with Aggregated Acknowlededgment Approach"; 2019 25th Conference of Open Innovations Association (FRUCT), Nov. 5, 2019 (8 pgs).

* cited by examiner

_US 11,361,654 B2_

OPERATING A FIRE SYSTEM NETWORK

TECHNICAL FIELD

The present disclosure relates generally to devices, methods, and systems for operating a fire system network.

BACKGROUND

Large facilities (e.g., buildings), such as commercial facilities, office buildings, hospitals, and the like, may have a fire system that can be triggered during an emergency situation (e.g., a fire) to warn occupants to evacuate. For example, a fire system may include a fire control panel and a plurality of fire sensing devices (e.g., smoke detectors), located throughout the facility (e.g., on different floors and/or in different rooms of the facility) that can sense a fire occurring in the facility and provide a notification of the fire to the occupants of the facility via alarms (e.g., audio and/or visual alarms).

Some previous approaches to fire systems utilize a wireless sensor mesh network. In order to meet the demands of time-sensitivity and reliability associated with a fire system, such networks may employ a deterministic and/or time-synchronized system (e.g., a time-division multiple access (TDMA)) system. However, such systems may not be scalable to larger networks due to their complexity and the costs involved in planning, designing, installing, and/or maintaining them. Other approaches that do not use a deterministic or time-synchronized system may not be adequately reliable for use in fire systems.

DETAILED DESCRIPTION

Figure 1:
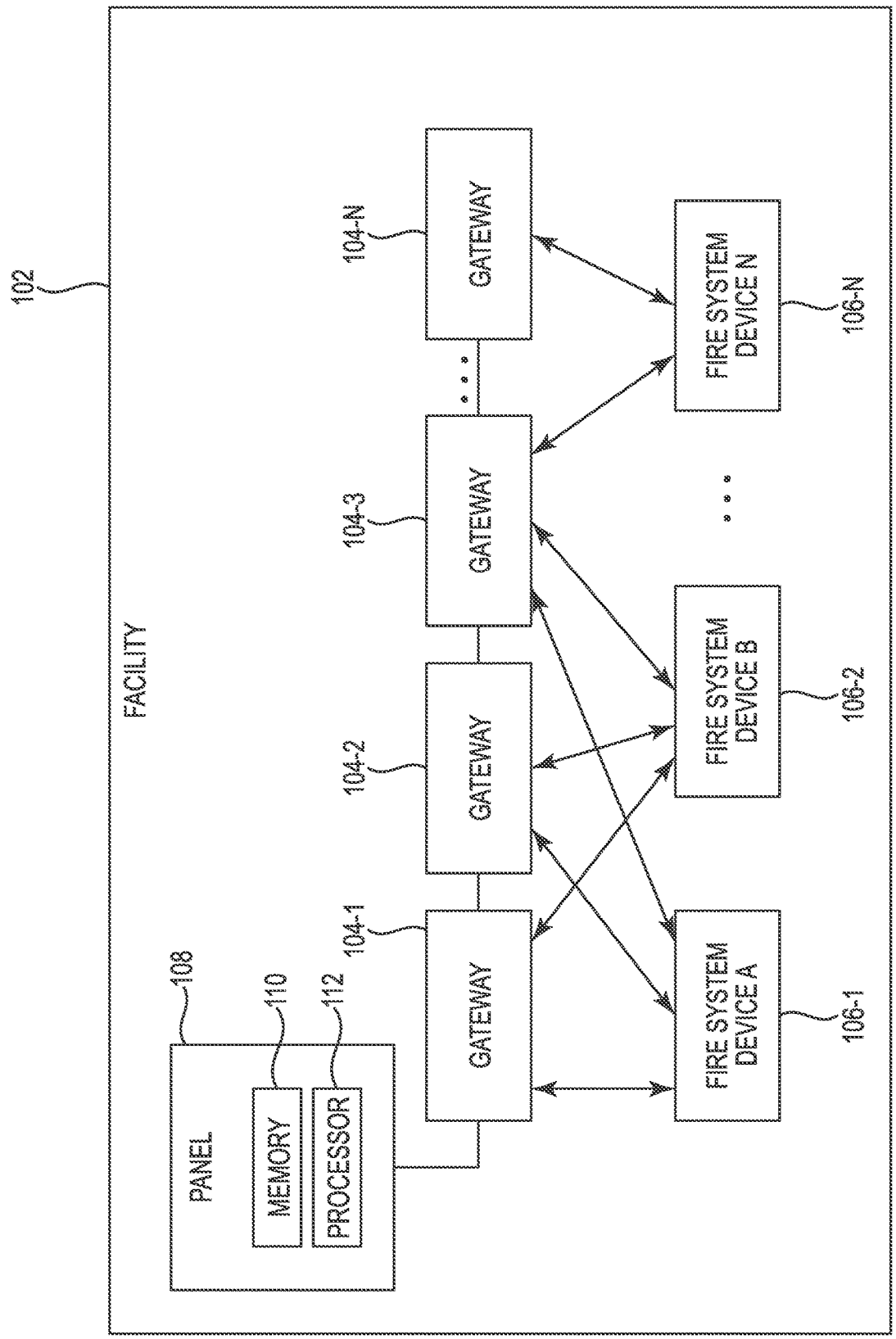
FIG. 1 illustrates a block diagram of a fire system network in accordance with one or more embodiments of the present disclosure.

Devices, methods, and systems for operating a fire system network are described herein. One method includes receiving a plurality of time-slotted maintenance messages over a period of time from each of a plurality of fire system devices located in a facility via a first spreading factor, receiving an event message from a fire system device of the plurality of fire system devices responsive to the fire system device determining a fire event, the event message sent via a second spreading factor, and sending a block actuate message to the plurality of fire system devices responsive to receiving the event message, wherein the block actuate message is configured to activate a fire alarm.

Reliability and timeliness of the communications within a fire system are paramount. In many cases, for instance, a certain degree of reliability may be mandated by law or regulations. In some jurisdictions, a limit on latency between the detection of a fire and the actuation of an alarm may be placed at ten seconds. Accordingly, deterministic systems (e.g., time-division multiple access (TDMA) systems) may be employed to ensure that communications between fire system network devices are received in a timely manner. However, such systems may not be scalable to larger networks due to their complexity and the costs involved in planning, designing, installing, and/or maintaining them.

In other applications, wireless network communications are carried out over a non-deterministic system (e.g., using Long Range Wide Area Network (LoRaWAN) protocol technology). For example, water or gas metering applications may utilize non-deterministic (e.g., asynchronous access) communications because the messages being communicated are comparatively few in number and not particularly time-sensitive compared to the messages communicated within a fire system network. However, asynchronous access systems offer scalability to a larger number of nodes (e.g., 1000 or more) because messages can be distributed over different channels, (e.g., frequencies), bandwidths, and/or spreading factors.

Embodiments of the present disclosure can combine the reliability of the time-slotted structure of TDMA with the scalability benefits of LoRa. Stated differently, embodiments of the present disclosure can employ a TDMA frame structure protocol on a LoRa radio to create what may be referred to as a "deterministic LoRa." As a result, embodiments herein can support large numbers of nodes (e.g., 1000 or more) in a fire system network while meeting latency demands. In addition, embodiments herein can increase device operability by reducing battery draining compared to previous approaches In a fire system network, different types of messages are communicated. These different types of messages may be sent using different rationales. For example, two different types of messages may be referred to as "heartbeat messages" and "event messages."

Much of the normal communication traffic in a fire system network may be referred to as "heartbeat messages." These periodic maintenance messages are uplink messages sent by each of the fire system devices of the fire system network to a control device (e.g., a fire panel) that inform the control device that the fire system devices are active and operating normally. Heartbeat messages can be considered to be relatively low priority messages. Other uplink messages include event messages. Event messages are sent by a fire system device that has determined or detected an emergency or an event (e.g., a fire). Event messages can be considered to be high priority uplink messages but occur substantially less frequently than the heartbeat messages.

Embodiments herein can employ a Media Access Control (MAC) layer protocol to communicate heartbeat messages within a fire system network in a time-slotted structure over a plurality of channels. The heartbeat messages can be communicated via a first spreading factor (SF) (or via a first range of spreading factors). The heartbeat messages can be acknowledged by multicast and/or block acknowledgements. When an event is detected, such as a fire, event messages can be communicated via a second spreading factor (or via a second range of spreading factors). For instance, heartbeat messages may be communicated via a spreading factor of 7 (SF7) and event messages may be communicated via a spreading factor of 12 (SF12). An increased spreading factor for event messages prevents the heartbeat messages that are being communicated from interfering with the event messages and ensures that the event messages are sent with increased range and reliability (e.g., the best possible reliability).

Typically, LoRa communication is random access and consequently collisions become increasingly probable with increased device counts. Embodiments of the present disclosure can organize the communication via the LoRa radio to obtain the benefits of both LoRa and TDMA.

As used herein, a "network" can provide a communication system that directly or indirectly links two or more computers and/or peripheral devices (e.g., fire system devices) and allows a fire panel, a gateway and/or a fire system device to access data and/or resources from other devices of the network. A network can allow users to share resources on their own systems with other network users and to access information on centrally located systems or on systems that are located at remote locations. For example, a network can tie a number of computing devices together to form a distributed control network (e.g., cloud).

A network may provide connections to the Internet and/or to the networks of other entities (e.g., organizations, institutions, etc.). Users may interact with network-enabled software applications to make a network request, such as to get data. Applications may also communicate with network management software, which can interact with network hardware to transmit information between devices on the network.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that mechanical, electrical, and/or process changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits. For example, 104 may reference element "04" in FIG. 1, and a similar element may be referenced as 204 in FIG. 2.

As used herein, "a", "an", or "a number of" something can refer to one or more such things, while "a plurality of" something can refer to more than one such things. For example, "a number of components" can refer to one or more components, while "a plurality of components" can refer to more than one component.

FIG. 1 illustrates a block diagram of a fire system network in accordance with one or more embodiments of the present disclosure. The network illustrated in FIG. 1 can be installed in a facility 102 and can include a plurality of gateway devices: a first gateway device 104-1, a second gateway device 104-2, a third gateway device 103, and an N gateway device 104-N (referred to cumulatively as "gateways 104"). The gateways 104 can be in communication with a plurality of fire system devices (a fire system device A 106-1, a fire system device B 106-2, ... fire system device N 106-N), and a panel 108.

The panel 108 can be a fire alarm control panel. The panel 108 can send and/or receive information from the other devices of the network. The panel 108 can monitor the operational integrity of the other devices of the network and can provide for automatic control of the fire system in the facility 102.

The panel 108 can include a memory 110 and a processor 112. The memory 110 can be any type of storage medium that can be accessed by the processor 112 to perform various examples of the present disclosure. For example, the memory 110 can be a non-transitory computer readable medium having computer readable instructions (e.g., computer program instructions) stored thereon, which, when executed by the processor 112, cause the processor 112 to operate a fire system network in accordance with the present disclosure. For instance, the processor 112 can execute the executable instructions stored in the memory 110 to receive a plurality of time-slotted maintenance messages over a period of time from each of a plurality of fire system devices located in a facility via a first spreading factor, receive an event message from a fire system device of the plurality of fire system devices responsive to the fire system device determining a fire event, the event message sent via a second spreading factor, and send a block actuate message to the plurality of fire system devices responsive to receiving the event message, wherein the block actuate message is configured to activate a fire alarm.

The memory 110 can be volatile or nonvolatile memory. The memory 110 can also be removable (e.g., portable) memory, or non-removable (e.g., internal) memory. For example, the memory 110 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disc read-only memory (CD-ROM)), flash memory, a laser disc, a digital versatile disc (DVD) or other optical storage, and/or a magnetic medium such as magnetic cassettes, tapes, or disks, among other types of memory.

Further, although the memory 110 is illustrated as being located within the panel 108, embodiments of the present disclosure are not so limited. For example, the memory 110 can also be located internal to another computing resource (e.g., enabling computer readable instructions to be downloaded over the Internet or another wired or wireless connection).

Embodiments herein can include hardware, firmware, and/or logic that can perform a particular function. For instance, some embodiments include circuitry. As used herein, "logic" is an alternative or additional processing resource to execute the actions and/or functions, described herein, which includes hardware (e.g., various forms of transistor logic, application specific integrated circuits (ASICs)), as opposed to computer executable instructions (e.g., software, firmware) stored in memory and executable by a processing resource.

Though four gateways 104 are shown in the example illustrated in FIG. 1, embodiments of the present disclosure are not so limited. In some embodiments the gateways 104 are configured the same (e.g., to provide diversity and/or redundancy). In some embodiments the gateways 104 are configured differently. For example, the gateway 104-1 can be configured to receive messages via particular channel(s), spreading factor(s), and/or bandwidths, and the gateway 104-2 can be configured to receive messages via the same or different channel(s), spreading factor(s), and/or bandwidths.

The gateways 104 can be in wireless communication with a fire system device A 106-1, a fire system device B 106-2, and a fire system device N 106-N (sometimes cumulatively referred to as "devices 106"). The network 100 is configured as a star network. Accordingly, each of the devices 106 communicates directly with the gateways 104. The devices 106 can be located throughout the facility 102. The devices 106 can be located in different rooms, wings, floors, and or portions of the facility 102. In some embodiments, such as that shown in FIG. 1, less than all of the fire system devices 106 may be in communication with all of the gateways 104. For example, as shown, the fire system device B 106-2 communicates with gateway 104-1, gateway 104-2, and gateway 104-3, but may not be in communication with gateway 104-N. Such a relationship may reflect the communication barriers and/or limitations present in large (e.g., geographically spread-out) systems.

The devices 106 can be sensing devices (sensors) configured to determine properties associated with an event. As referred to herein, an event is an occurrence for which an alarm may be triggered. The present disclosure discusses fire as an example, though it is noted that embodiments herein are not so limited. For instance, events can include security (e.g., intrusion) events and other events. Sensors associated with a fire system can include gas (e.g., carbon monoxide, carbon dioxide, etc.) sensors, photodetectors, temperature sensors, and/or particle detectors, among other types of sensors. In some embodiments, the devices 106 can include actuators. An actuator, as referred to herein, includes a device or a component configured to notify people of an event. In some embodiments, for instance, an actuator refers to an alarm (e.g., an audio alarm, siren, horn, etc.). In some embodiments, an actuator refers to a visual indicator (e.g., a light, signage, etc.).

Figure 2:
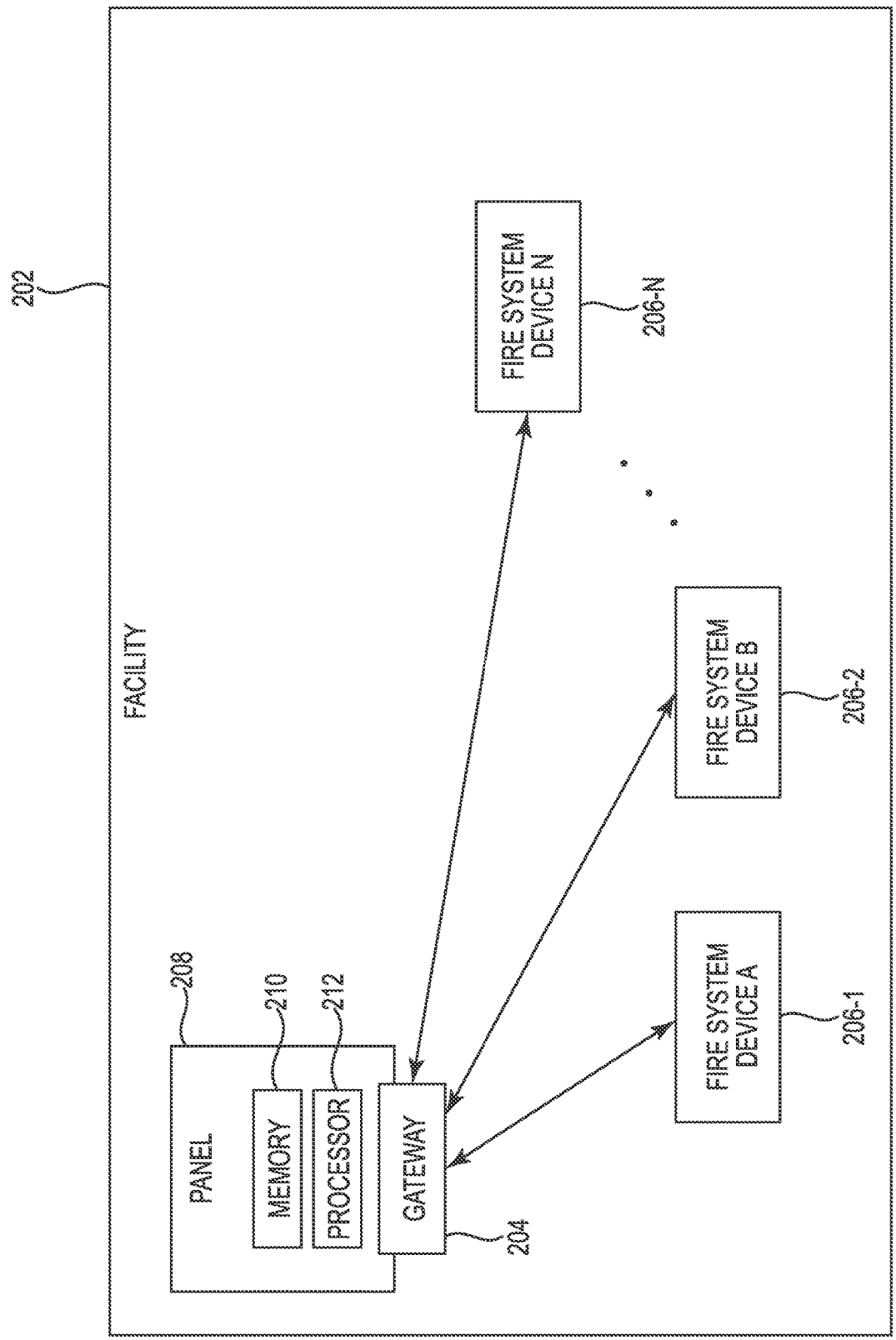
FIG. 2 illustrates a block diagram of another fire system network in accordance with one or more embodiments of the present disclosure.

FIG. 2 illustrates a block diagram of another fire system network in accordance with one or more embodiments of the present disclosure. Contrasted with the system illustrated in FIG. 1, which may be representative of larger installations, the system illustrated in FIG. 2 may be an example of a system installed in a smaller facility, for instance.

The network illustrated in FIG. 2 can be installed in a facility 202 and may include a single gateway device 204. The gateway 204 can be in communication with a plurality of fire system devices (a fire system device A 206-1, a fire system device B 206-2, . . . a fire system device N 206-N). As shown in FIG. 2, the gateway 204 can be a portion or, or can be incorporated into, a panel 208. For instance, in smaller facilities, the location of the panel 208 may be suitable for wireless communication with each of the devices 206 of the system.

Figure 3A:
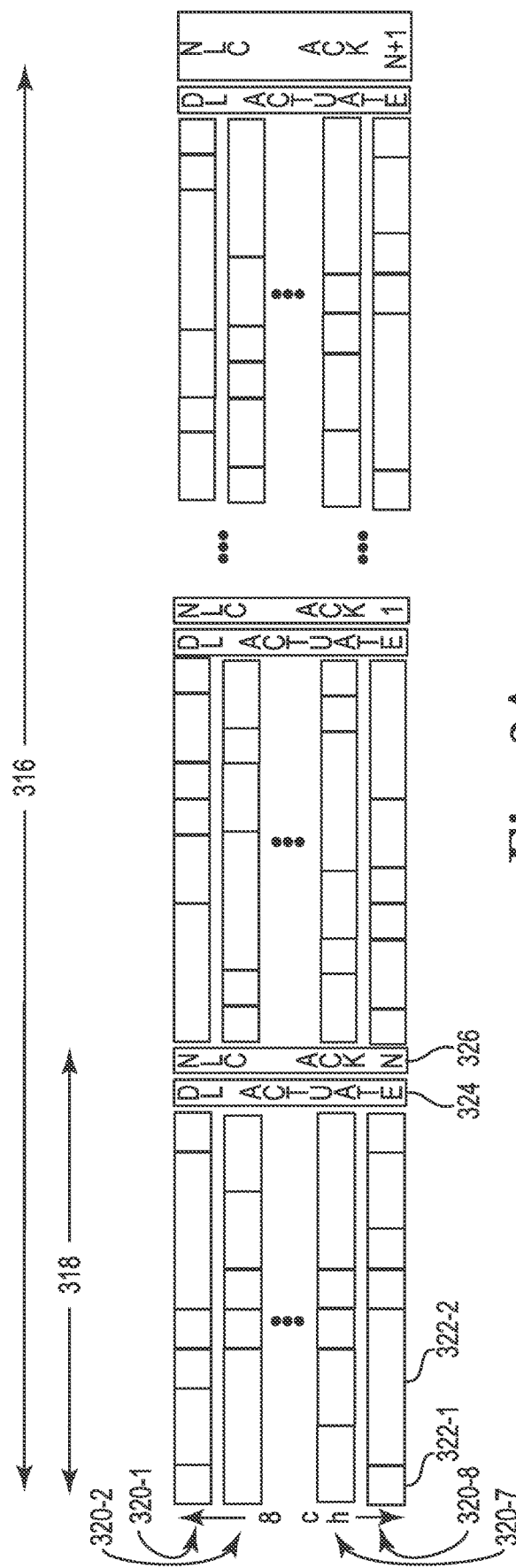
FIG. 3A is a diagram illustrating a plurality of messages in a fire system network in accordance with one or more embodiments of the present disclosure.

FIG. 3A is a diagram illustrating a plurality of messages in a fire system network in accordance with one or more embodiments of the present disclosure. As shown in FIG. 3A, a period of time (referred to herein as a "super frame" 316 can be determined and/or set for the messages herein. In some embodiments, a duration of the super frame 316 is less than 30 seconds. Each of the fire system devices can have one deterministic opportunity during the super frame 316 to send a data packet (e.g., a heartbeat message). The heartbeat messages, as previously discussed, are uplink messages (e.g., sent uplink to the gateway 104 and/or 204, previously described) and may be "non-latency critical." FIG. 3 illustrates a plurality of heartbeat messages: a first heartbeat message 322-1, a second heartbeat message 322-2, and a third heartbeat message 322-3 (cumulatively referred to as "heartbeat messages 322"). As previously discussed, a fire system network in accordance with embodiments herein can include 1000 or more devices, each of which can send a heartbeat message during each super frame 316. The deterministic scheme of the heartbeat messages 322 can reduce (e.g., prevent) packet overlap.

The heartbeat messages 322 can be sent via a plurality of frequencies (sometimes referred to herein as "channels"). The example illustrated in FIG. 3A includes eight channels, four of which are illustrated: a first channel 320-1, a second channel 320-2, a seventh channel 320-7, and an eighth channel 320-8. Accordingly, eight heartbeat messages 322 can be transmitted at a given time instance with one being transmitted per each of the channels 320.

Downlink messages can be sent during the super frame 316. Downlink messages in accordance with the present disclosure can be block messages. Stated differently, downlink messages can be sent from the gateway to all of the plurality of fire system devices. Accordingly, communication within the network can be asymmetric (e.g., eight messages are received by a gateway at a given time instance while one message can be sent at a given time instance). As shown in FIG. 3A, downlink messages can include a downlink actuate message 324 (discussed below in connection with FIG. 3B and a downlink acknowledgement message 326.

The downlink acknowledgment message 326 can be sent to the fire system devices. The super frame 316 can be divided into a plurality of micro frames 318. The micro frame 318 can be a portion of the super frame (e.g., one second in duration). A downlink acknowledgement message 326 can be sent at the end of each micro frame 318 acknowledging the heartbeat messages received during the micro frame 318.

Figure 3B:
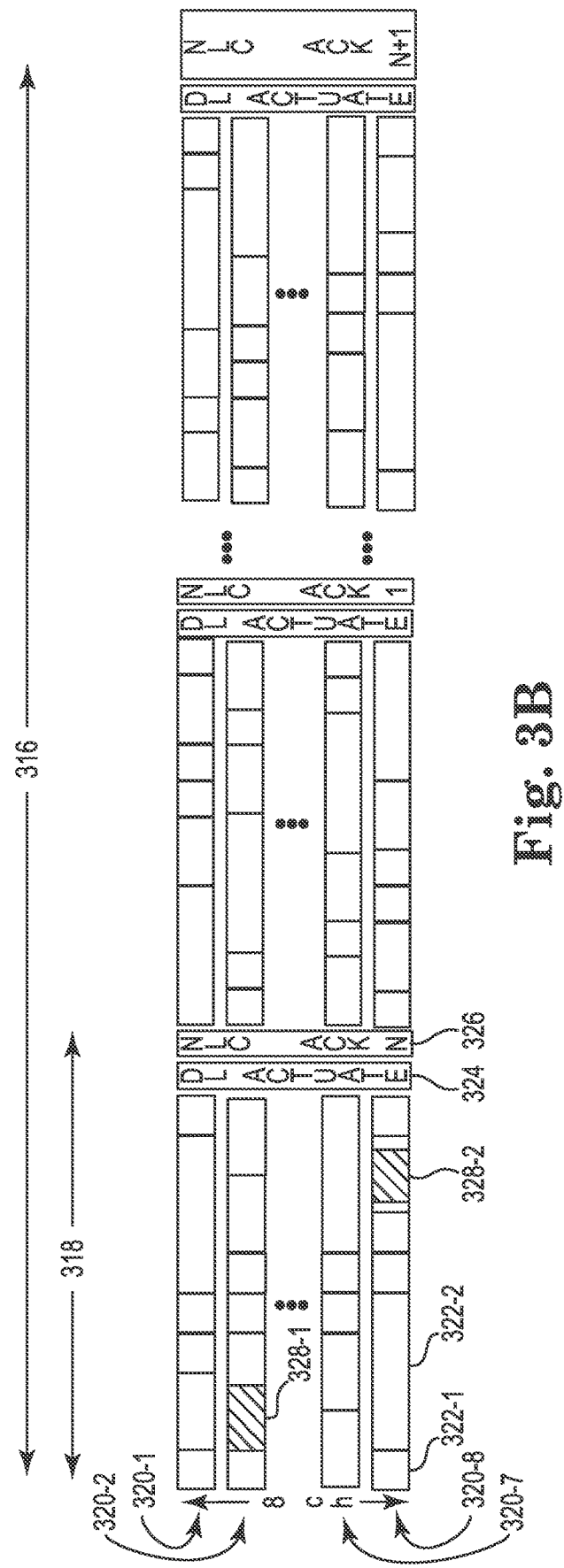
FIG. 3B is another diagram illustrating a plurality of messages in a fire system network in accordance with one or more embodiments of the present disclosure.

FIG. 3B is another diagram illustrating a plurality of messages in a fire system network in accordance with one or more embodiments of the present disclosure. At any instance, a fire system device can reconfigure itself to deliver an event message. Event messages can exceed the heartbeat messages 322 in size. For example, in some embodiments an event message can be 5 bytes in size and a heartbeat message 322 can be 3 bytes in size. In some embodiments, an event message can be between 4 and 6 bytes in size and a heartbeat message 322 can be between 2 and 4 bytes in size vs. It is noted that embodiments of the present disclosure are not so limited, however. As shown in the example illustrated in FIG. 3B, for instance, a first event message 328-1 is sent via the second channel 320-2 during the micro frame 318 and a second event message 328-2 is sent via the eighth channel 320-8 during the micro frame 318. The first event message 328-1 and the second event message 328-2 may be cumulatively referred to herein as "event messages 328." The event messages 328 can be sent by a same fire system device. The event messages 328 can be sent by different fire system devices.

The device(s) sending the event messages 328 can be time-aligned to the network to avoid the relatively short amount of time allotted in each time slot of the super frame 316. As previously discussed, the event messages 328 can be sent via a higher spreading factor than the heartbeat messages 322. In some embodiments, each event message 328 can be repeatedly sent (e.g., triplicated) over different frequency channels. In some embodiments, event messages 328 can be repeatedly sent (or attempted to be sent) every micro frame 318. In some embodiments, the event messages 328 can be acknowledged with a block event acknowledgment message sent via a dedicated downlink time slot in each micro frame (e.g., in a manner analogous to the acknowledgment of heartbeat messages 322 via the downlink acknowledgement message 326).

When a fire system device has received the downlink actuate message 324, it can cause the actuation of an alarm or strobe, for instance. When a fire system device has received the downlink actuate message 324, it can reply to the control device with an individual acknowledgement of the downlink actuate message 324. Such an individual acknowledgment can be sent via one or more of a second set of 8 uplink frequencies, for instance, and can be time-aligned to the network to avoid the relatively short amount of time allotted in each time slot of the super frame 318.

Figure 4:
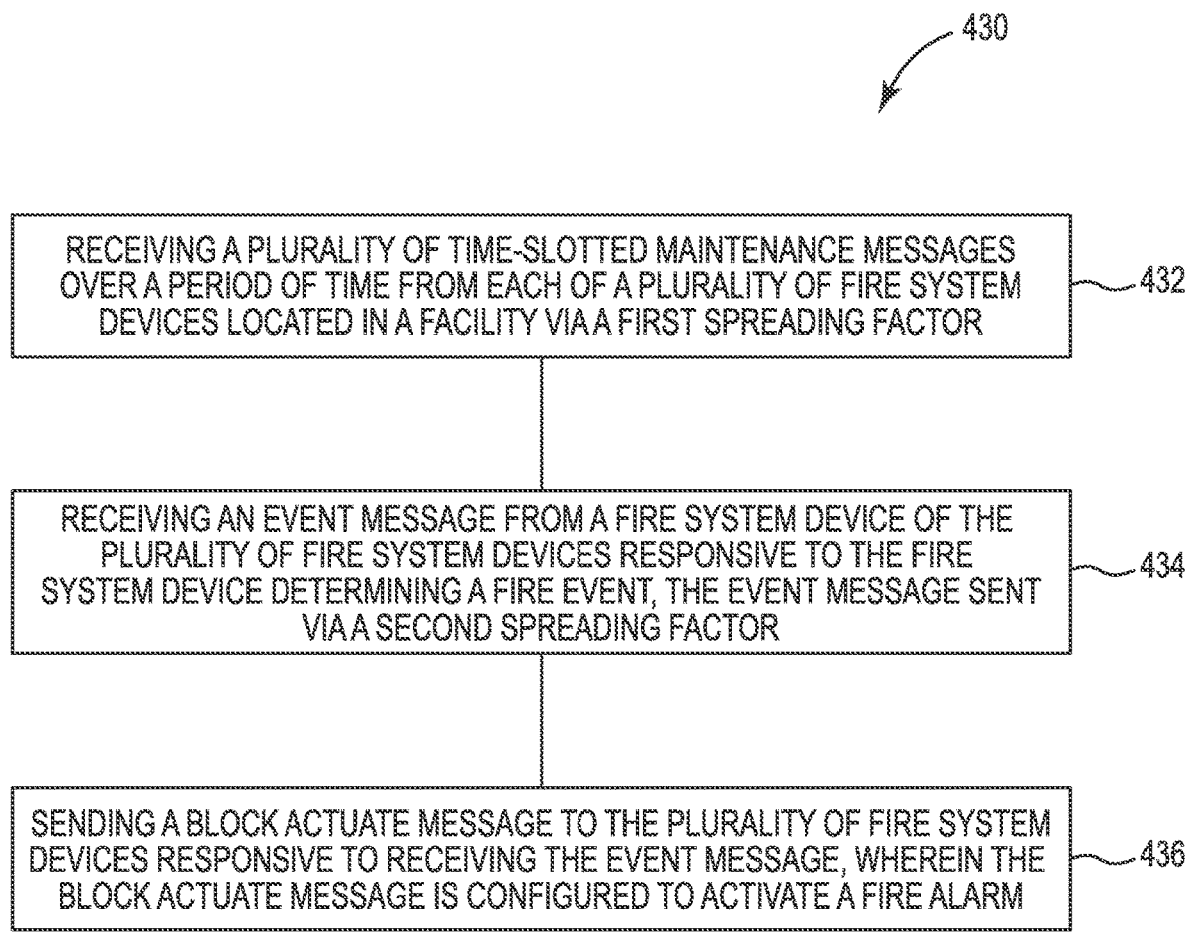
FIG. 4 illustrates a method for operating a fire system network in accordance with one or more embodiments of the present disclosure.

FIG. 4 illustrates a method 430 for operating a fire system network in accordance with one or more embodiments of the present disclosure. The method 430 can be implemented by a LoRa gateway, for instance, such as those described herein. At block 432, the method 430 includes receiving a plurality of time-slotted maintenance messages over a period of time from each of a plurality of fire system devices located in a facility via a first spreading factor. The maintenance messages, which may be referred to as "heartbeat messages" can be received according to a TDMA protocol, as previously described.

At block 434, the method 430 includes receiving an event message from a fire system device of the plurality of fire system devices responsive to the fire system device determining a fire event, the event message sent via a second spreading factor. The event message can be received independent of the TDMA protocol. For instance, the event message can be received via an ALOHA channel. In some embodiments, a size of the event message can exceed a size of the periodic maintenance messages.

At block 436, the method 430 includes sending a block actuate message to the plurality of fire system devices responsive to receiving the event message, wherein the block actuate message is configured to activate a fire alarm. In some embodiments, the block actuate message can be sent within a particular period of time (e.g., 10 seconds) within receipt of the event message. The fire alarm can be an audio alarm (e.g., a siren). The fire alarm can be a visual alarm (e.g., a flashing light).

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method for operating a fire system network, comprising:
   receiving a plurality of time-slotted maintenance messages over a period of time from each of a plurality of fire system devices located in a facility via a first spreading factor;
   receiving an event message from a fire system device of the plurality of fire system devices responsive to the fire system device determining a fire event, the event message sent via a second spreading factor; and
   sending a block actuate message to the plurality of fire system devices responsive to receiving the event message, wherein the block actuate message is configured to activate a fire alarm.

2. The method of claim 1, wherein the method is implemented by a Long Range (LoRa) gateway device.

3. The method of claim 1, wherein the plurality of fire system devices are in a star network configuration.

4. The method of claim 1, wherein the plurality of fire system devices in the star network configuration include at least 1000 fire system devices.

5. The method of claim 1, wherein the method includes sending the block actuate message within 10 seconds of receiving the event message.

6. The method of claim 1, wherein the method includes receiving the plurality of time-slotted maintenance messages according to a time-division multiple access (TDMA) protocol.

7. The method of claim 1, wherein the method includes receiving the event message from the fire system device via an ALOHA channel.

8. The method of claim 1, wherein the method includes sending a block acknowledgement message to each of the plurality of fire system devices acknowledging the plurality of time-slotted maintenance messages.

9. A non-transitory machine-readable medium having instructions stored thereon which, when executed by a processor, cause the processor to:
   receive a plurality of time-slotted maintenance messages over a period of time from each of a plurality of fire system devices located in a facility via a first spreading factor;
   receive an event message from a fire system device of the plurality of fire system devices responsive to the fire system device determining a fire event, the event message sent via a second spreading factor; and
   send a block actuate message to the plurality of fire system devices responsive to receiving the event message, wherein the block actuate message is configured to activate a fire alarm.

10. The medium of claim 9, including instructions to send a block event acknowledgment message to each of the plurality of fire system devices acknowledging the event message.

11. A fire system, comprising:
   a plurality of fire system devices located in a facility, wherein each of the plurality of fire system devices is configured to send deterministic periodic maintenance messages via a first spreading factor;

a gateway device in wireless communication with the plurality of fire system devices configured to receive the deterministic periodic maintenance messages;

wherein, in response to a fire system device of the plurality of fire system devices determining a fire event:

the fire system device is configured to send an event message via a second spreading factor;

the gateway device is configured to send a block actuate message to the plurality of fire system devices responsive to receiving the event message from the fire system device; and each of the fire system devices is configured to activate a fire alarm responsive to receiving the block actuate message.

12. The system of claim 11, wherein a size of the deterministic periodic maintenance messages is exceeded by a size of the event message.

13. The system of claim 12, wherein each of the deterministic periodic maintenance messages is between 2 and 4 bytes, and wherein the event message is between 4 and 6 bytes.

14. The system of claim 11, wherein the fire system device is configured to re-send the event message via the second spreading factor periodically.

15. The system of claim 11, wherein the plurality of fire system devices include a plurality of photodetectors, a plurality of temperature sensors, and a plurality of particle detectors.

16. The system of claim 11, further comprising another gateway device in wireless communication with the plurality of fire system devices configured to receive the deterministic periodic maintenance messages;

wherein, in response to the fire system device of the plurality of fire system devices determining a fire event:

the fire system device is configured to send an event message via a second spreading factor;

the gateway device and the other gateway device are each configured to send a block actuate message to the plurality of fire system devices responsive to receiving the event message from the fire system device; and each of the fire system devices is configured to activate a fire alarm responsive to receiving either the block actuate message from the gateway device or the block actuate message from the other gateway device.

17. The system of claim 11, further comprising a different gateway device in wireless communication with the plurality of fire system devices configured to receive the deterministic periodic maintenance messages, wherein the gateway device and the different gateway device are configured to receive messages of different spreading factors.

18. The system of claim 11, wherein the fire system device is configured to repeatedly send the event message via the second spreading factor over a plurality of channels.

19. The system of claim 11, wherein each of the fire system devices is configured to send an individual acknowledgment message responsive to receiving the block actuate message.

20. The system of claim 19, wherein each of the fire system devices is configured to send the individual acknowledgment message via a different set of channels than a set of channels used to send the deterministic periodic maintenance messages.

* * * * *